D. Lynahon
Boot Pattern
No. 264.
Reissued May 9, 1854.
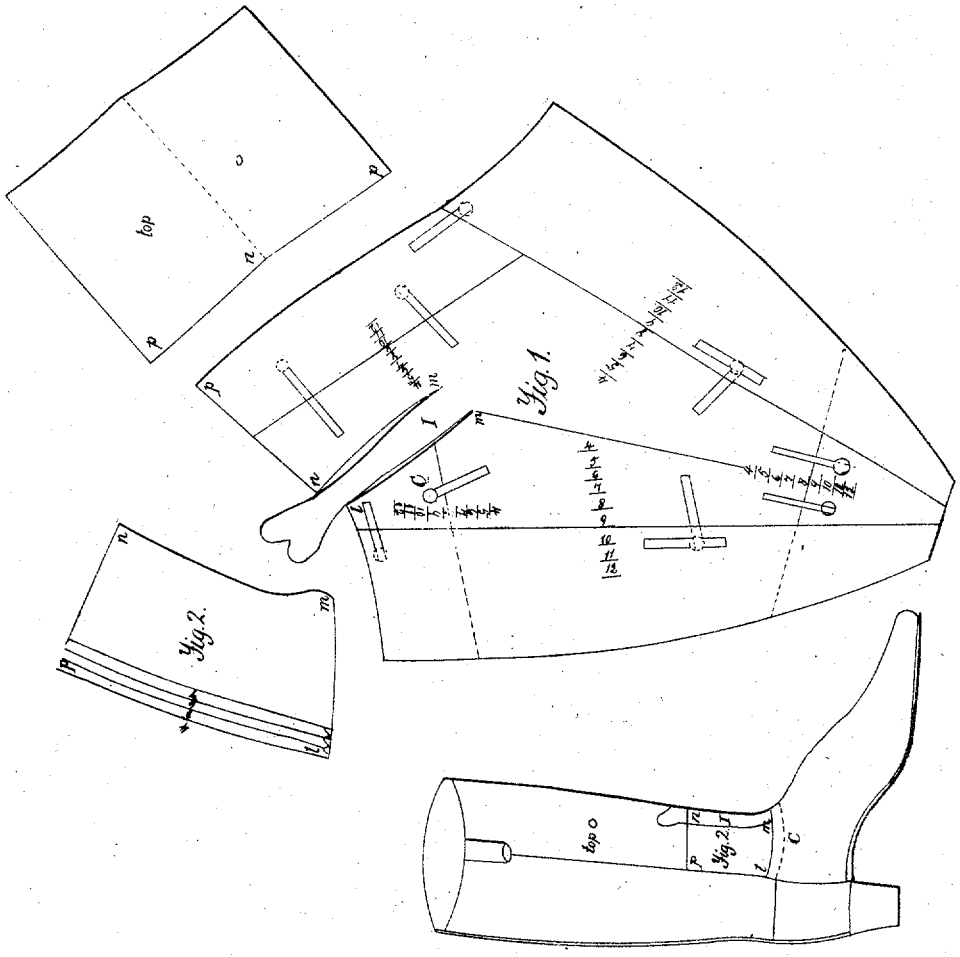

UNITED STATES PATENT OFFICE.

DANIEL LYNAHON, OF BUFFALO, NEW YORK.

IMPROVEMENT IN CUTTING BOOTS.

Specification forming part of Letters Patent No. 10,134, dated October 18, 1853; Reissue No. 264, dated May 9, 1854.

*To all whom it may concern:*

Be it known that I, DANIEL LYNAHON, of the city of Buffalo, county of Erie, and State of New York, have invented a new and useful improvement in the mode of making uncrimped boots of any materials of which boots may be made, by which they are cut, fitting perfectly the wearer's foot at the curve above the instep, and greater economy is used in cutting the leather and the seams better secured from ripping than by the modes heretofore in use; and I do hereby declare the following to be an exact description of the said invention.

I first cut the vamp according to Figure 1 in the drawings accompanying, and fold it together in the center, as in the common mode. I secondly cut a piece of leather according to Fig. 2, fitting the vamp at *l m* and *m n*, the corresponding part of the boot on the opposite side being a portion of the vamp itself. I then sew Fig. 2 to Fig. 1 along the seams *l m* and *m n*. I then join the top to Figs. 1 and 2 by the seam *p n*. Next I cover the seam *m n* with the tongue *i* (which is also a part of the vamp) by stitching it on each side of the seam *m n*, preventing that seam from being seen, and from ripping by means of the working of the foot in the boot. Then I bring the same tongue across the seam *p n* to the top, thereby keeping that seam in its place and preventing it from ripping, thus making a permanent and neat-setting front.

What I claim as new in this mode is—

The tongue *i*, which gives the vamp a more exact crimped curve, covers the seam *m n* from being seen and secures it from ripping, and keeps the seam *l m* and *p n* permanent by receiving the strain which comes on them when drawing on the boot, which improvement may be applied to any material whatever of which boots may be made.

Dated Buffalo, February 15, 1854.

DANIEL LYNAHON.

Witnesses:

DAVID F. DAY,

C. A. BAKER.